(12) United States Patent
Komatsu et al.

(10) Patent No.: US 6,914,900 B1
(45) Date of Patent: Jul. 5, 2005

(54) METHOD AND APPARATUS FOR CONNECTING COMMUNICATION DEVICE VIA IP NETWORK

(75) Inventors: Satoru Komatsu, Kawasaki (JP); Masahiko Yamagishi, Kawasaki (JP); Tsutomu Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 750 days.

(21) Appl. No.: 09/660,226

(22) Filed: Sep. 12, 2000

(30) Foreign Application Priority Data

Nov. 12, 1999 (JP) ............................................ 11-322014

(51) Int. Cl.[7] .......................... H04L 12/56; H04L 12/66
(52) U.S. Cl. .............. 370/356; 370/395.21; 370/395.61
(58) Field of Search ................................ 370/352, 353, 370/354, 355, 356, 357, 358, 359, 395.1, 395.2, 395.21

(56) References Cited

U.S. PATENT DOCUMENTS

| 6,253,249 | B1 | * | 6/2001 | Belzile .......................... 709/249 |
| 6,370,120 | B1 | * | 4/2002 | Hardy ........................... 370/252 |
| 6,466,548 | B1 | * | 10/2002 | Fitzgerald ..................... 370/249 |
| 6,512,761 | B1 | * | 1/2003 | Schuster et al. .............. 370/352 |
| 6,584,110 | B1 | * | 6/2003 | Mizuta et al. ................ 370/401 |
| 6,600,735 | B1 | * | 7/2003 | Iwama et al. ................. 370/352 |
| 2003/0198218 | A1 | * | 10/2003 | Farris et al. ................. 370/356 |

FOREIGN PATENT DOCUMENTS

JP 57-145456 9/1982

* cited by examiner

Primary Examiner—Hassan Kizou
Assistant Examiner—Gregory Sefcheck
(74) Attorney, Agent, or Firm—Katten Muchin Zavis Rosenman

(57) ABSTRACT

Disclosed is a method of connecting a telephone via an IP network. An exchange on the originating side (1) evaluates voice quality along a route through the IP network to an exchange on a terminating side when a call originate request has been issued to connect the originating telephone via the IP network, (2) connects the originating telephone to the terminating telephone via the above-mentioned route if the voice quality is good, and (3) if the voice quality is bad, controls a connection of the telephone in accordance with a command from the caller or by selecting another route automatically such as an alternative route through the IP network or another route through a network other than the IP network.

19 Claims, 10 Drawing Sheets

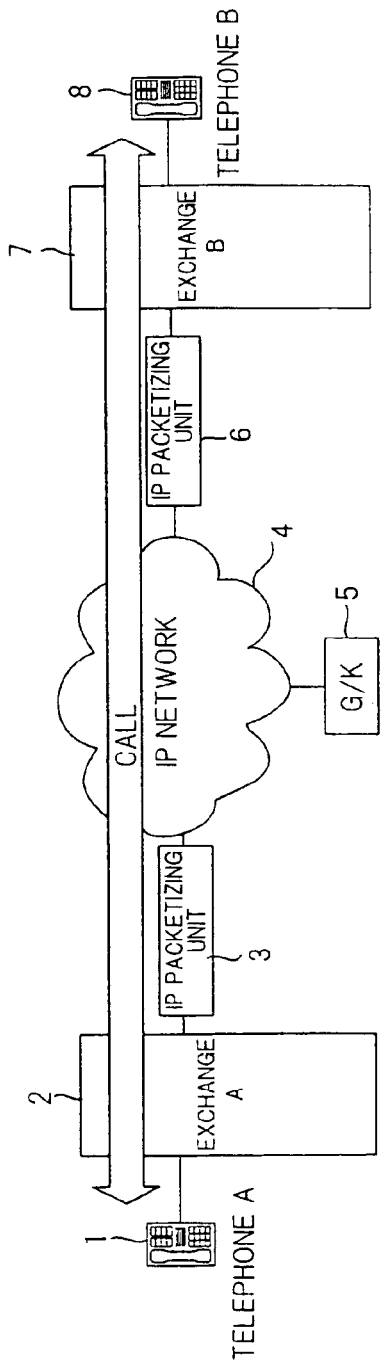
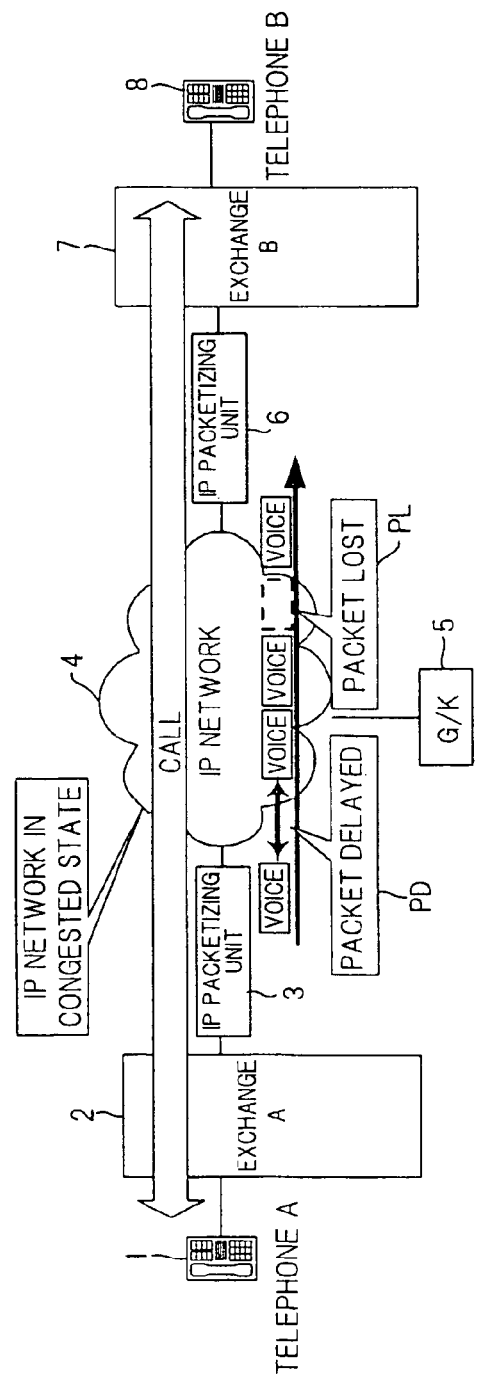

US 6,914,900 B1

METHOD AND APPARATUS FOR CONNECTING COMMUNICATION DEVICE VIA IP NETWORK

BACKGROUND OF THE INVENTION

This invention relates to a method and apparatus for connecting a communication device such as a telephone via an IP (Internet Protocol) network. More particularly, the invention relates to a communication device connecting method and apparatus in which when a call originate request has been issued to make a connection to a called terminal via an IP network, the originating terminal is connected to the terminating terminal upon taking into account the communication quality of the route through the IP network.

IP telephone systems for placing telephone calls via an IP network currently have been spotlighted as telephone systems for the next generation to supplant existing telephone systems based upon STM (Synchronous Transfer Mode) networks. Arranging it so that ease of use and convenience on a par with that of existing telephone schemes can be realized is an important challenge confronting IP telephony. Various modes of utilizing conventional IP telephone systems have been proposed and implemented. One such example is an Internet relay telephone service provided to general users such as individuals by an Internet telephone service provider. The purpose of this system is to lower the cost of calls by using the Internet as an intermediary.

FIG. 9A is a diagram useful in describing such an Internet relay telephone service. When the user of a telephone 1 dials up an access point of an Internet telephone service provider, an IP packetizing unit 3 responds via an exchange (STM telephone network) 2 and allows the user to enter the telephone number of the call destination. On the basis of the entered telephone number, the IP packetizing unit 3 queries a server 5, referred to as a "gatekeeper", via an IP network 4 with regard to the IP address of an IP packetizing unit 6 at the destination of transferred packets. Upon learning of the IP address, the IP packetizing unit 3 executes a procedure (stipulated by Recommendation H.225.0) for setting up an IP connection to the IP packetizing unit 6 of the called party. If the IP connection is established, then the telephone call is implemented via a route constituted by the originating telephone 1, the exchange 2, the IP packetizing unit 3, the IP network 4, the IP packetizing unit 6, an exchange 7 and a terminating telephone 8 in the order mentioned. It should be noted, however, that the transfer of actual voice data (voice packets) is performed between the IP packetizing units 3 and 6 using RTP (Real Time Protocol).

Thus, to place a telephone call from an originating telephone to a terminating telephone via an IP network in accordance with the prior art, it will suffice to dial the IP-network access telephone number and the telephone number of the terminating telephone. To make a telephone call via an existing STM network, only the telephone number of the terminating telephone need be dialed.

An IP network offers best-effort traffic service and uses the network band to the fullest extent possible; it does not compensate for bandwidth and communication quality. As a consequence, if the IP network 4 becomes congested, packet loss PL occurs, as shown in FIG. 9B, a packet delay PD is produced and delay time varies owing to the characteristic of the IP network. Thus, though the IP network offers the advantage of low communication cost, there are instances where voice is delayed or interrupted by congestion, resulting is degraded voice quality. This differs from the case where use is made of an STM network.

The state of the art is such that if an IP network has been accessed to make a telephone call, the call must be continued regardless of whether voice quality is good or bad. If voice quality is poor and the caller wishes to re-connect via an STM network, the user must take the trouble to first break the connection and then redial.

SUMMARY OF THE INVENTION

Accordingly, an object of the present invention is to so arrange it that when a call originate request is issued to make a connection to a terminating terminal via an IP network, the call can be implemented with excellent communication quality taking into account the communication quality of the route through the IP network.

Another object of the present invention is to so arrange it that a telephone call is connected via a route through an IP network if the communication quality of the route is good, whereas if the quality through this route is bad, the call is connected by selecting an alternative route within the IP network or another route through a network (e.g., an STM or ATM network) other than the IP network, whereby it is possible to implement the call with excellent communication quality.

A further object of the present invention is to so arrange it that if the communication quality of a route through an IP network is bad, a call is connected by selecting an alternative route within the IP network or another route through a network (e.g., an STM or ATM network) other than the IP network in accordance with a command from the calling party or automatically in accordance with a determination made by the switching system, whereby it is possible to implement the call with excellent communication quality.

Yet another object of the present invention is to so arrange it that another route can be selected by a designation made by the caller through a simple operation without requiring that the caller take the trouble to disconnect and then redial.

In accordance with the present invention, the foregoing objects are attained by (1) evaluating voice quality along a route through an IP network from a switching system on an originating side to a switching system on a terminating side when a call originate request has been issued to connect an originating terminal to a terminating terminal via the IP network; (2) connecting the originating terminal and the terminating terminal if the communication quality is good; and (3) if the communication quality is bad, controlling connection of the communication device in accordance with a command from the caller or performing control by selecting a route other than the first-mentioned route, e.g., an alternative route within the IP network or another route via a network (STM or ATM network) other than the IP network, automatically in accordance with a determination made by a switching system. If this arrangement is adopted, a telephone call can be implemented with an excellent communication quality.

In the present invention, the evaluation of communication quality is performed by (1) sending a test packet from the switching system on the originating side to the switching system on the terminating side via the route through the IP network before a channel is established; (2) sending an ACK packet from the switching system of the terminating side to the switching system on the originating side in response to receipt of the test packet; (3) measuring, at the exchange on the originating side, delay time from sending of the test packet to receipt of the ACK packet; and (4) comparing length of the delay time with length of a set time. If this arrangement is adopted, control to connect a communication device can be performed upon measuring communication quality currently prevailing in the IP network. This makes it possible to achieve excellent call quality in reliable fashion.

In the present invention, evaluation of communication quality can be performed in the following manner as well: (1) preserving packet loss rate, etc., that prevailed during a call after the call ends, and (2) determining whether communication quality is good or bad by referring to the loss rate. If this arrangement is adopted, it is unnecessary to measure communication quality before the channel is established, as a result of which it is possible to shorten time required for a call to start.

In the present invention, if communication quality of a route through the IP network is not good, the switching system reports this to the caller by communication and the caller, by operating keys on a terminal, instructs the exchange to perform one of the following control operations: (1) to continue connection control via the above-mentioned route for which the communication quality has been determined to be no good; (2) to perform connection control via an alternative route through the IP network; (3) to perform connection control through another route via a network (e.g., STM or ATM network) other than the IP network; and (4) to perform disconnect control. If this arrangement is adopted, the caller can specify control for the next communication device connection through a simple operation without being required to reconnect.

In the present invention, if communication quality of a route through the IP network is not good, a switching system automatically selects an alternative route through the IP network or a route which connects the originating terminal and the terminating terminal via a network (e.g., STM or ATM network) other than the IP network, and connects these terminals via the selected route. If this arrangement is adopted, greater convenience is provided because an excellent route can be selected without requiring that the caller perform any operation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 9A and 9B are diagrams useful in describing a mode of using an IP telephone according to the prior art as well as the problems of the prior art.

DESCRIPTION OF THE PREFERRED EMBODIMENT (A) Overview of the Present Invention (a) Overall Construction FIG. 1 is a diagram useful in describing an overview of the present invention. Shown in FIG. 1 are telephones 10, 60, exchanges 20, 50, an IP network 30 and a network (e.g., an STM network) 40 other than an IP network. The exchange 20 includes an STM switch network (call channel circuit) 21, a central controller (CC) 22, a main memory (MM) 23 and an IP packetizing unit 24 for executing processing in accordance with various protocols, IP-packetizing voice data, sending the voice-data packets to the IP network 30, receiving IP packets from the IP network 30, restoring the IP packets to voice data and outputting the voice data to the STM switch network 21. If the voice quality of a route through the IP network is poor, an announcement unit 25 reports this fact to the calling party via the telephone 10. The exchange 50 includes an STM switch network 51, a central controller (CC) 52, a main memory (MM) 53 and an IP packetizing unit 54.

Figure 1:
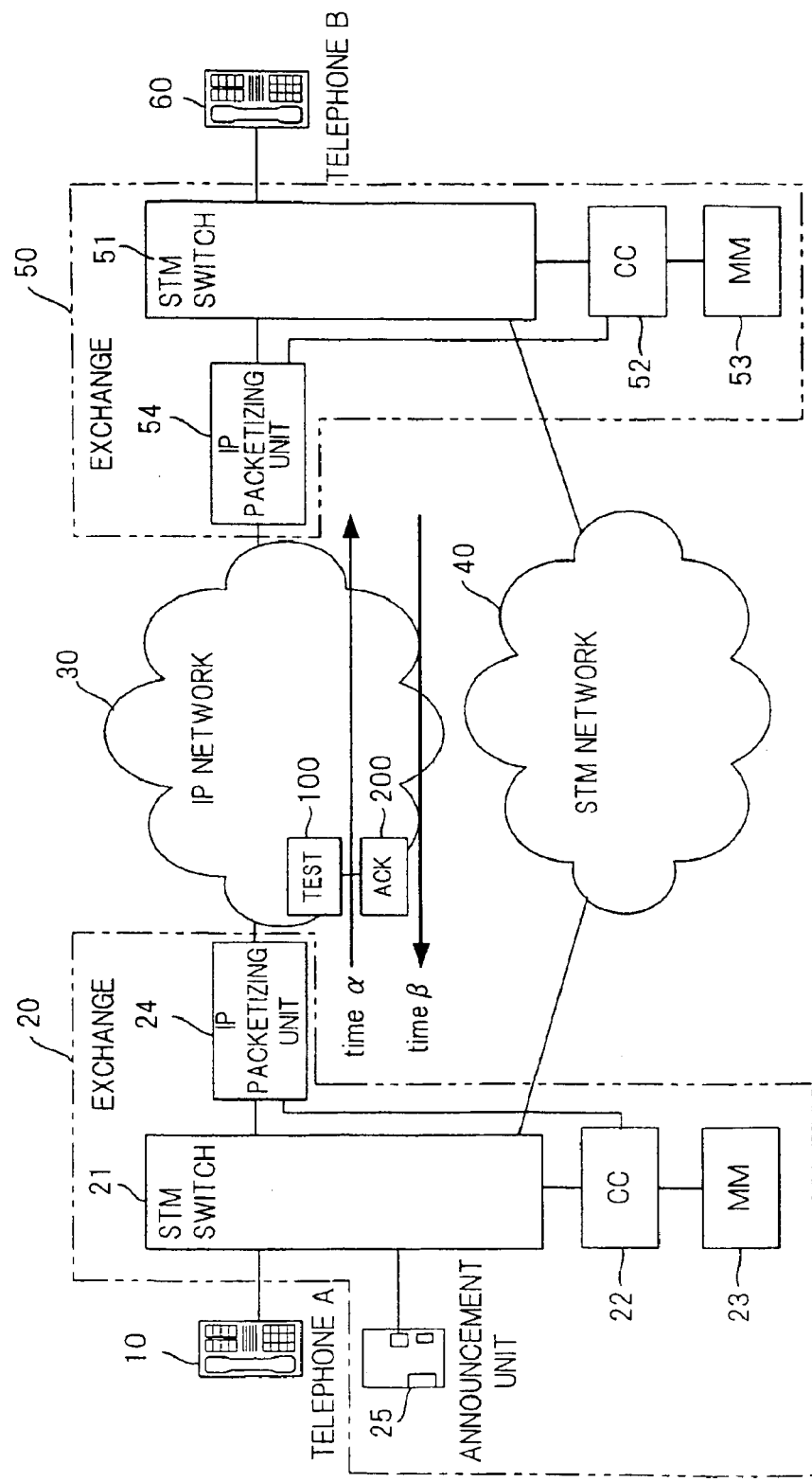
FIG. 1 is a diagram useful in describing an overview of the present invention.

(b) Overview of Telephone Connection Via IP Network

When a call originate request is issued from the originating telephone 10 to connect this telephone to the terminating telephone 60 via the IP network 30, the central controller (CC) 22 of the exchange 20 on the originating side (1) evaluates the voice quality along the route through the IP network 30 from the IP packetizing unit 24 on the originating side to the IP packetizing unit 54 on the terminating side. (2) If the voice quality is good, the central controller 22 connects the originating telephone 10 and the terminating telephone 60 via the above-mentioned route. (3) If the voice quality is poor, then the central controller 22 performs telephone connecting control in accordance with a command issued by the caller from the telephone 10 or performs control upon selecting a route other than the above-mentioned route, e.g., an alternative route within the IP network or another route via a network (STM or ATM network) other than the IP network, automatically in accordance with a determination made by the central controller 22 independently. If this arrangement is adopted, a telephone call can be implemented with an excellent voice quality.

(c) Methods of Evaluating Voice Quality (c-1) First Evaluation Method

In order to evaluate voice quality, (1) the central controller 22 instructs the IP packetizing unit 24 to send a test packet to the IP packetizing unit 54 on the terminating side before a channel is established. (2) The IP packetizing unit 24 responds by creating a test packet 100 and sending the test packet 100 to the IP packetizing unit 54 on the terminating side via the IP network 30. (3) If the test packet 100 is received, the IP packetizing unit 54 creates an ACK packet 200 and sends the ACK packet 200 to the IP packetizing unit 24 on the transmitting side. (4) The central controller 22 measures the time ($\alpha+\beta$) that elapses from issuance of the test packet 100 to receipt of the ACK packet 200 and compares the length of this measured time with the length of a set time to thereby determine evaluate voice quality. More specifically, if the measured time is shorter than the set time, this means that the delay is small. Hence a decision is rendered to the effect that voice quality is good. If the measured time is longer than the set time, the delay is large and therefore a decision is rendered to the effect that voice quality is poor. If this arrangement is adopted, the telephone connection can be controlled upon measuring voice quality in the IP network at the time of an outgoing call. This makes it possible to achieve excellent voice quality in reliable fashion.

(c-2) Second Evaluation Method

Voice quality can be evaluated in the manner described below as well. Specifically, (1) the central controller 22 calculates packet loss rate $\eta(=N_{PL}/N_{PT})$ from lost packet count $N_{PL}$ and transmitted packet count $N_{PT}$ prevailing during a call and reported by the IP packetizing unit 24, and preserves the calculated loss rate for each route after the call ends, and (2) the central controller 22 determines, before the channel is established, whether voice quality is good or bad by referring to the loss rate corresponding to the route that connects the originating telephone and the terminating telephone. If this arrangement is adopted, it is unnecessary to measure voice quality by sending and receiving the test packet and ACK packet before the channel is established, as a result of which it is possible to shorten time required for a call to start.

(d) Control in Accordance Command from Caller

If the voice quality of the route through the IP network is poor, the central controller 22 connects the announcement unit 25 and the originating telephone 10 via the STM switch network 21 and provides the caller with a voice announcement from the announcement unit 25 to the effect that the voice quality is poor. Using keys on the telephone 10, the caller instructs the central controller 22 to perform one of the following control operations: (1) to continue connection control via the above-mentioned route for which the voice quality has been determined to be no good; (2) to perform connection control via an alternative route through the IP network; (3) to perform connection control via another route via a network other than the IP network; and (4) to perform disconnect control. Thereafter, the central controller 22 exercises connection control in accordance with the command from the caller. As a result, even if the voice quality of the route through the IP network is poor, the caller can instruct the exchange to perform the next connection control operation through a simple manipulation without requiring redialing.

(e) Automatic Control by System

If voice quality of a route through the IP network is poor, the central controller 22 can automatically select a route that connects the originating telephone and the terminating telephone via a network (e.g., STM or ATM network) other than the IP network and can connect these terminals via the selected route. If this arrangement is adopted, greater convenience is provided because a telephone conversation can be implemented with good voice quality without requiring that the caller perform any operation.

It should be noted that an arrangement is adopted in which both the control method (d) in accordance with a command from the caller and the system automatic control method (e) are possible. In this case it is determined by agreement with the subscriber as to which method should be used for controlling the telephone connection. If the voice quality through the IP network is poor, the telephone connection is controlled in accordance with the method that has been determined.

(B) Network Configuration (a) Overall Configuration

Figure 2:
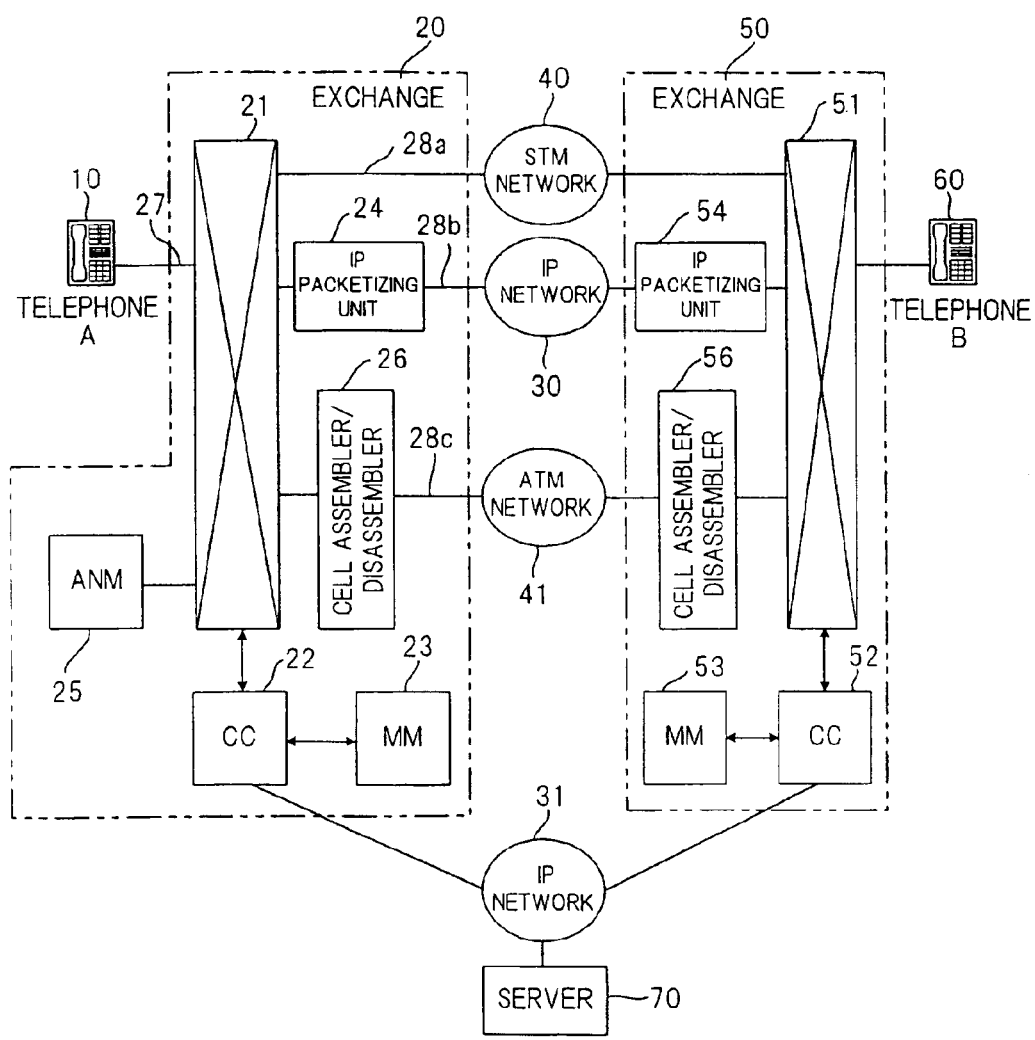
FIG. 2 is a block diagram illustrating the construction of a network to which the telephone connecting control method of the present invention is applied.

FIG. 2 is a block diagram illustrating the configuration of a network to which the telephone connection control method of the present invention is applied. Components shown in FIG. 2 identical with those of FIG. 1 are designated by like reference characters. Shown in FIG. 2 are the telephones 10, 60, the exchanges 20, 50, the IP network 30, an IP network 31, the STM network 40, an ATM (Asynchronous Transfer Mode) network 41 and a server 70. By agreement made in advance, the telephone 10 is capable of being connected via the IP network and via a network (e.g., the STM or ATM network) other than the IP network. The server 70 stores the correspondence between telephone numbers and IP addresses of IP packetizing units and, in response to a request from the exchange on the originating side, provides the IP address of the IP packetizing unit on the terminating side that corresponds to the telephone number of the terminating telephone.

The front panel 20 includes the STM switch network 21, the central controller (CC) 22, the main memory (MM) 23, the IP packetizing unit 24, the announcement unit (ANM) 25, a cell assembler/disassembler 26 and a device (not shown) for generating various tones. The STM switch network 21 accommodates a subscriber line 27, which is for accommodating the telephone 10, and a number of trunks such as an ATM trunk 28a; an IP trunk 28b and an ATM trunk 28c. The STM trunk, IP trunk and ATM trunk construct trunk groups (an STM trunk group, IP trunk group and ATM trunk group) at the respective destinations, and the central controller 22 manages the state of use and state of congestion of the trunks in each trunk group using a management table.

The IP packetizing unit 24 executes processing in accordance with various protocols, converts voice data to IP packets, sends the packet to the IP network 30, restores IP packets received from the IP network 30 to voice data and outputs the voice data to the STM switch network 21. The exchange 50 has a construction similar to that of the exchange 20 and includes the STM switch network 51, the central controller (CC) 52, the main memory (MM) 53, the IP packetizing unit 54 and a cell assembler/disassembler 56.

(b) Subscriber Data/System Data

Figure 3:
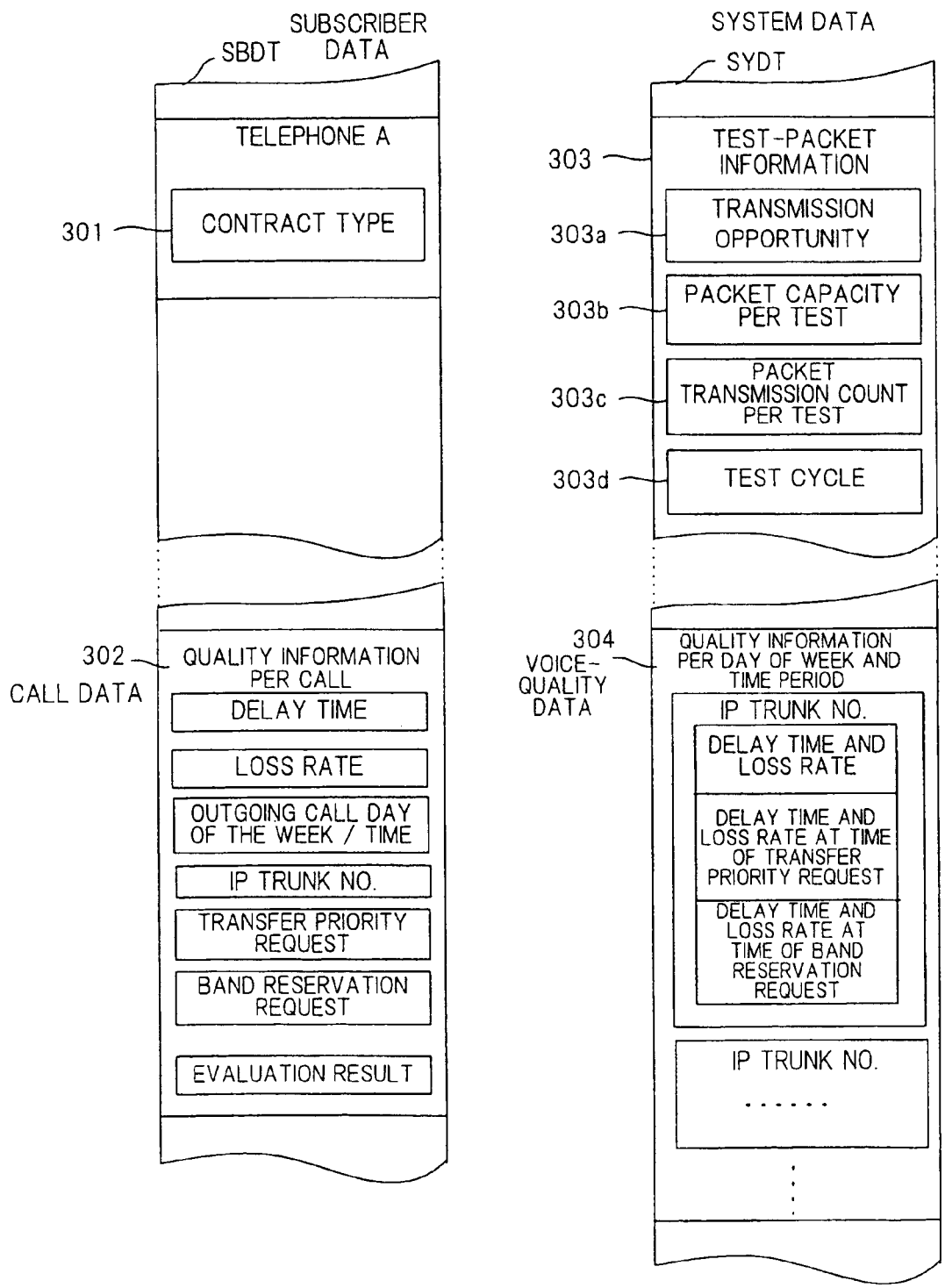
FIG. 3 is a diagram useful in describing subscriber data and system data.

Subscriber data SBDT and system data SYDT is stored in the main memory 23 of the exchange 20 in the manner shown in FIG. 3. The subscriber data SBDT contains contract type 301 and call data 302 stored in association with the telephone number of a subscriber. In a case where the voice quality of a route through an IP network is poor, the contract type 301 specifies whether the connection of the telephone is to be controlled in accordance with a command from the caller or upon selecting the route automatically in accordance with a determination made by the system. In the case of the former, the caller operates keys on the originating telephone (enters a specific number) to instruct the central controller 22 to perform one of the following control operations: (1) to continue connection control via the route for which the voice quality is poor; (2) to perform connection control via an alternative route through the IP network; (3) to perform connection control via another route via a network (STM or ATM network) other than the IP network; and (4) to perform disconnect control. The central controller 22 exercises connection control in accordance with the command from the caller. In the case of the latter, the central controller 22 automatically selects an alternative route within the IP network or a route that connects the originating telephone and the terminating telephone via a network (e.g., STM or ATM network) other than the IP network and connects these terminals via the selected route.

The call data 302 is information indicative of the quality of a call currently in progress via a route within the IP network and includes delay time or loss rate, day of the week and time period of the call, the IP trunk number, whether or not transfer priority has been requested, whether or not band reservation has been requested and result of evaluation as to whether voice quality is good or bad. The call data 302 is preserved as voice-quality data in the system data SYDT in response to conclusion of the call.

The system data SYDT contains test-packet information 303 and voice-quality data 304. The test-packet information 303 includes (1) transmission opportunity 303a, (2) packet capacity 303b of the test packet, (3) packet count 303c indicative of number of packets sent per test, and (4) test cycle 303d which specifies whether evaluation of voice quality is to be performed for every call or for every several calls.

The transmission opportunity 303a stipulates the method of measuring voice quality. Methods of measuring voice quality are of two types, namely (A) a post-call voice-quality measurement mode and (B) a pre-call voice-quality measurement mode. In the post-call voice-quality measurement mode (A), voice-quality data (packet loss rate) relating to the preceding call is saved as the system data SYDT, network selection for the current call is performed based upon this voice-quality data, voice-quality data is measured while the current call is in progress and this data is saved after the call in order to make the network selection for the next call. In the pre-call voice-quality measurement mode (B), whether the current voice quality is good or bad is measured by transmitting a test packet before a call is established and then making the network selection based upon the result of measurement.

The voice-quality data 304 contains, for every day of the week/time period of call generation, and for every call route (IP trunk number), voice-quality data such as delay time of packet loss rate, delay time or packet loss rate when transfer priority is requested, and delay time or packet loss rate when band reservation is requested.

(c) IP Packetizing Unit

Figure 4:
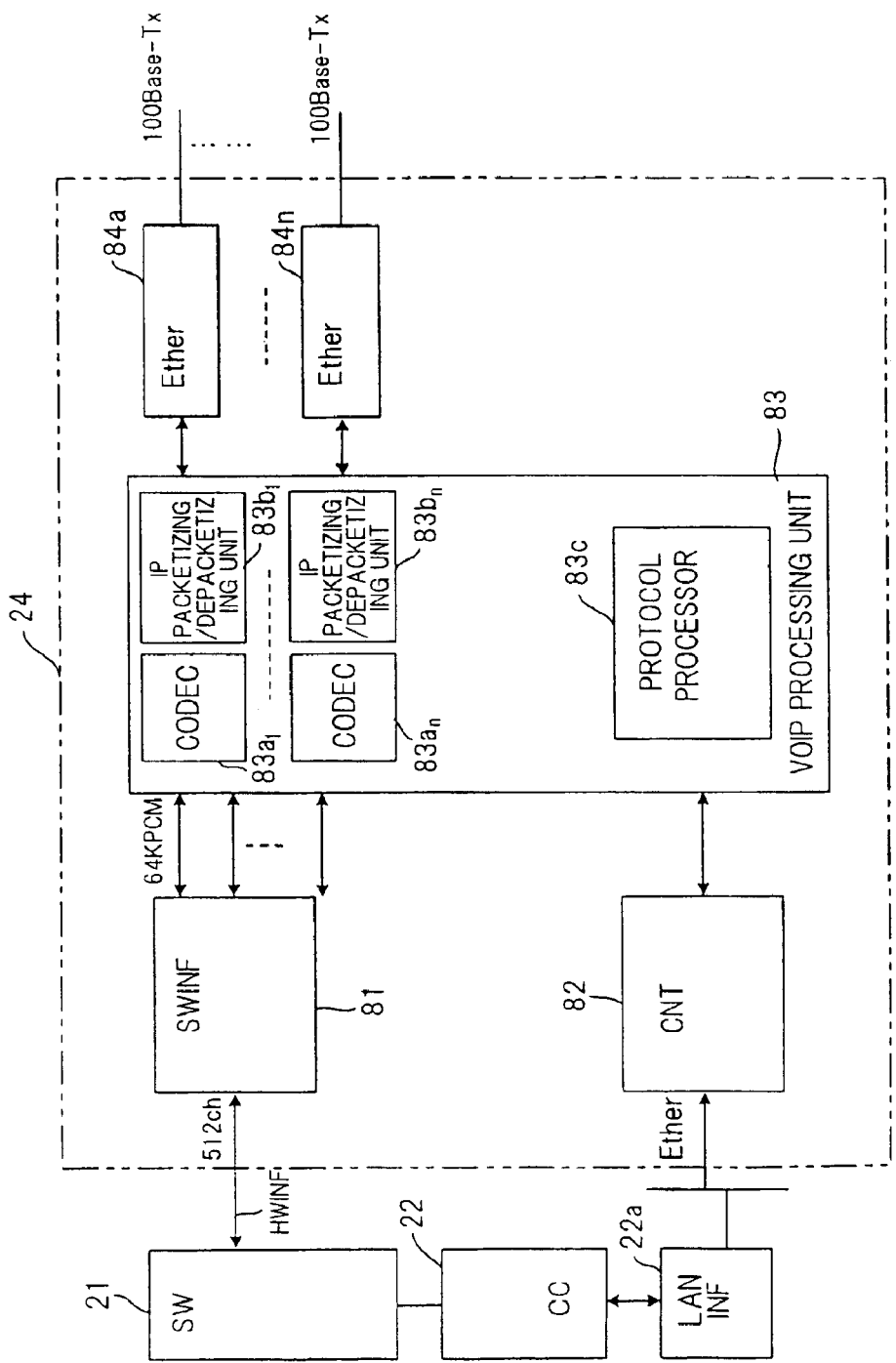
FIG. 4 is a block diagram illustrating the construction of an IP packetizing unit according to the present invention.

FIG. 4 is a block diagram of the IP packetizing unit 24. A switching interface 81 separates multiplexed voice data of a plurality of channels entering from the side of the exchange into 64-kbps PCM voice data and outputs this voice data. Further, the switching interface 81 multiplexes PCM voice data and sends the multiplexed data to the side of the exchange.

A control unit 82 sends and receives control data to and from the central controller 22 via Ethernet, controls the evaluation of voice quality and performs other control as well. For example, if the transmission opportunity stipulates the post-call voice-quality measurement mode, the control unit 82 sends the lost packet count $N_{PL}$ and transmitted packet count $N_{PT}$, which were acquired during a call, to the central controller 22 after the completion of the call, and the central controller 22 calculates the packet loss rate η using the transmitted packet count and lost packet count and saves this as loss rate in the voice-quality data 304 (see FIG. 3). If the transmission opportunity stipulates the pre-call voice-quality measurement mode, the control unit 82 sends the test-packet transmission count and the test-packet capacity per test to the control unit 82 and also instructs the control unit 82 to issue the test packets before a channel is established. The control unit 82 responds by instructing a VoIP (Voice over IP) processing unit 83 to create and send a test packet. Further, upon being notified of receipt of an ACK packet, which acknowledges the test packet, from the VoIP processing unit 83, the control unit 82 reports this to the central controller 22. The latter then calculates elapsed time from transmission of the test packet to receipt of the ACK packet as delay time and evaluates voice quality based upon the length of the delay time.

The VoIP processing unit 83 has CODECs 83a₁–83aₙ for compressing 64-kbps voice data or restoring compressed data, IP packetizing/depacketizing units 83b₁–83bₙ for putting compressed data into the form of IP packets (voice packets) and sending the packet to the side of the IP network, and for disassembling the voice packets received from the side of the IP network and inputting the resulting data to the CODECs, and a protocol processor 83c for executing processing in accordance with various protocols. The protocol processor 83c manages the transmitted packet count and the lost packet count and executes processing for the creation and transmission of test packets and for the receipt and reporting of ACK packets, etc. In accordance with RTP (Real Time Protocol), when packets are not received in sequential order, notification to this effect is obtained from the other party. Such notification therefore makes it possible to recognize the occurrence of a lost packet. By counting the number of notifications, the number of packets lost can be ascertained.

Ether cards 84a–84n each incorporate a MAC controller, add a MAC header onto an IP packet and then send the IP packet from a 100Base-TX shared transmission line to the IP network via a prescribed router. Further, each Ether card removes the MAC header from a frame that enters from the IP network via a prescribed router and inputs the result to the VOIP processing unit 83.

Figure 5A:
FIGS. 5A and 5B are diagrams useful in describing packet structures.

FIG. 5A is a diagram showing the structure of a voice packet. The voice packet is composed of an IP header, a UDP header, an RTP header and voice data. The reason for using the UDP (User Datagram Protocol) and RTP is that packets must be sent continuously at regular intervals without interruption to the greatest extent possible so that voice can be reproduced in real time on the receiving side. In case of real-time voice relay, a telephone conversation can proceed even with some loss of packets and TCP (Transmission Control Protocol), therefore, is not used. The encoded voice data is sent upon being packed into the RTP user data (payload).

Figure 5B:
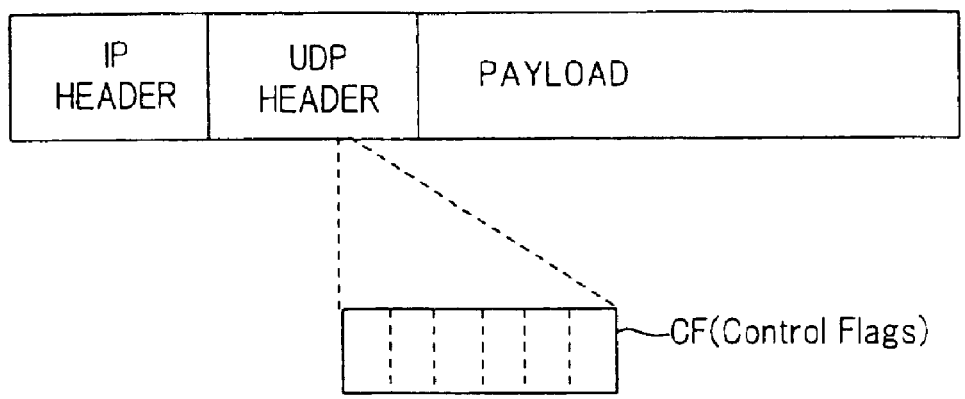

FIG. 5B is a diagram showing the structure of a test packet/ACK packet. The packet is composed of an IP header, a TCP header and a payload, and the type of packet, i.e., test or ACK, is specified by a control flag CF in the TCP header.

Figure 6:
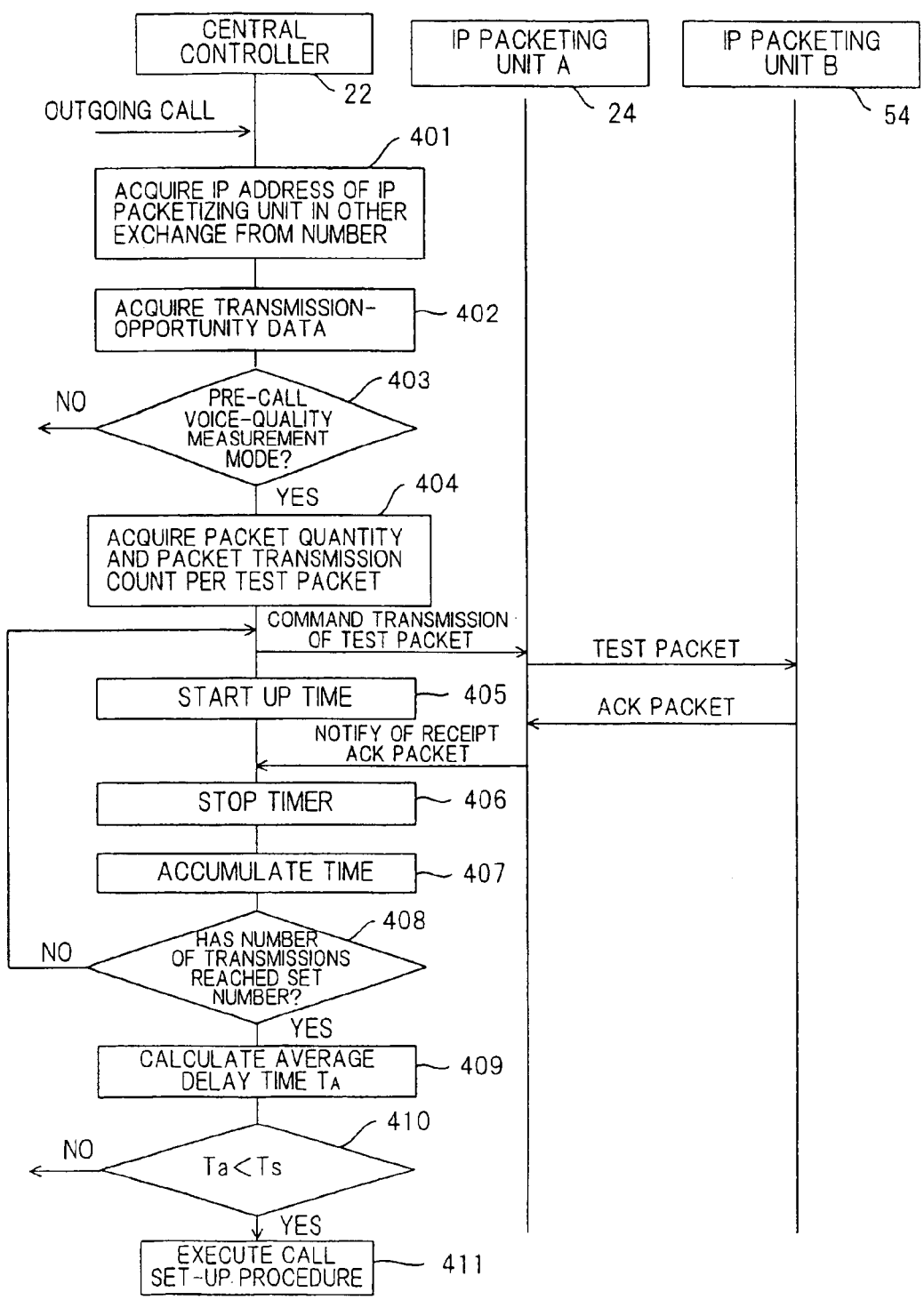
FIG. 6 is a diagram useful in describing the procedure of processing for controlling telephone connection in a case where a pre-call voice-quality measurement mode is adopted.

(C) Procedure for Controlling Telephone Connection by Pre-Call Voice-Quality Measurement FIG. 6 is a diagram useful in describing a procedure for controlling telephone connection in a case where the pre-call voice-quality measurement mode is adopted. If an outgoing call is made from the telephone 10, the central controller 22 acquires from the server 70 the IP address of the IP packetizing unit in the exchange conforming to the telephone number of the call destination (step 401). Next, the central controller 22 acquires the transmission-opportunity data that has been stored in the main memory 23 (step 402) and checks to determine whether the prevailing mode in the pre-call voice-quality measurement mode (step 403). If the decision is "YES", then the central controller 22 acquires the packet transmission count and the packet capacity per test packet (step 404), instructs the IP packetizing unit 24 to send a test packet and starts up a timer (step 405).

In response to the command to send a test packet, the IP packetizing unit 24 sends a test packet to the opposing IP packetizing unit 54 and, upon receiving the test packet, the IP packetizing unit 54 sends back an ACK packet. If the ACK packet is received, the IP packetizing unit 24 so notifies the central controller 22. Accordingly, the central controller 22 stops the timer (step 406), accumulates the time from issuance of the test past to receipt of the ACK packet (step 407), checks to determine whether the number of transmissions has reached a set number (step 408) and, if the answer is "NO", causes the transmission of the next test packet and executes the processing from step 405 onward.

On the other hand, if the decision rendered at step S408 is that the number of transmissions has attained the set number, the central controller 22 calculates average delay time $T_A$ (step 409), compares the average delay time $T_A$ with a set time $T_S$ (step 410) and connects the originating telephone 10 and terminating telephone 60 (step 411) by executing a call set-up procedure if $T_A < T_S$ holds.

(D) Overall Control of Telephone Connection

Figure 7:
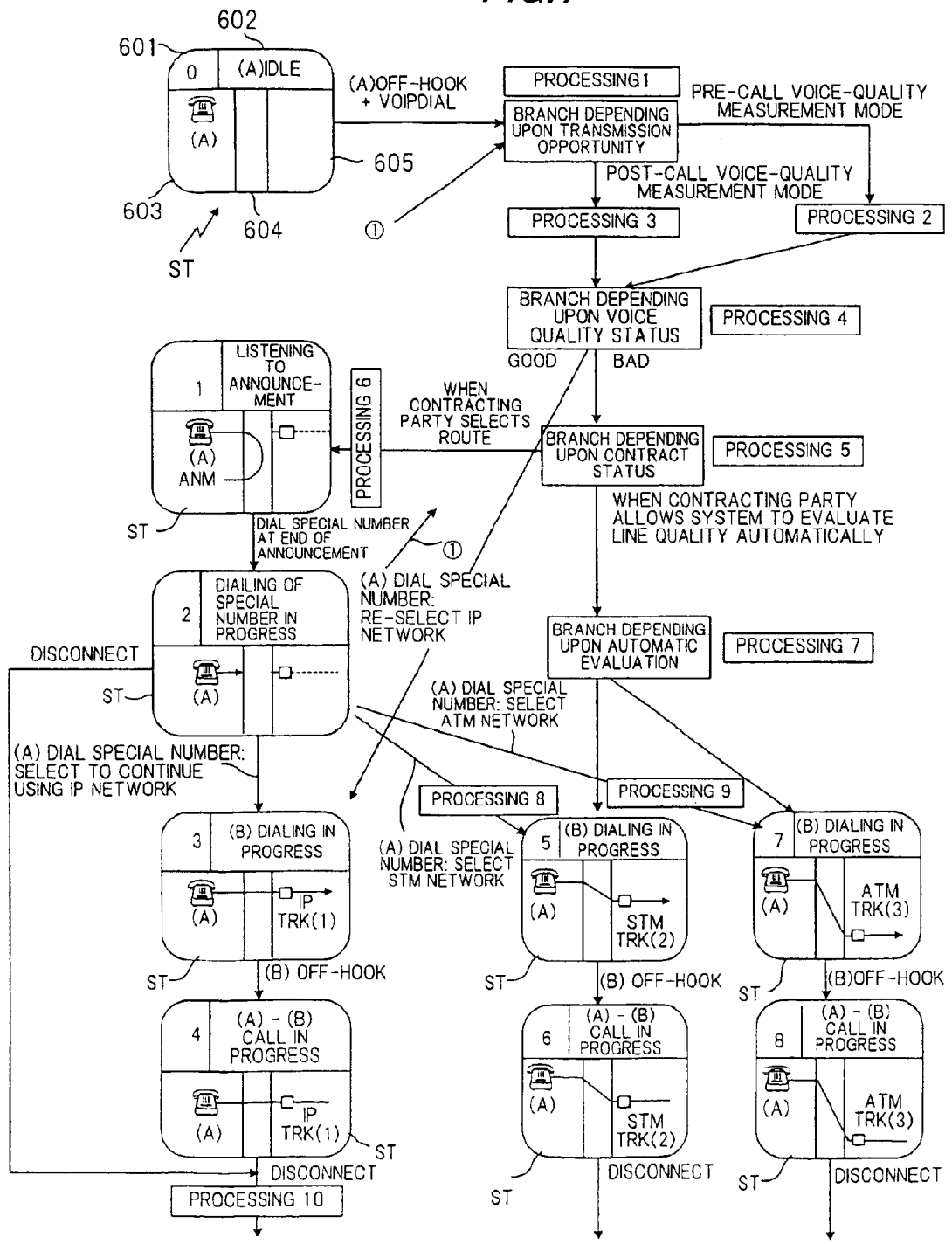
FIG. 7 is a status-transition diagram useful in describing overall telephone connection control.

FIG. 7 is a status-transition diagram useful in describing overall telephone connection control, and FIGS. 8A to 8J are flowcharts of a variety of processing. In FIG. 7, ST represents a symbol which indicates status, and numbers 601, 602, 603, 604 and 605 denote a status number, status description, originating telephone, switch network and trunk, respectively.

(a) Processing 1

Figure 8A:
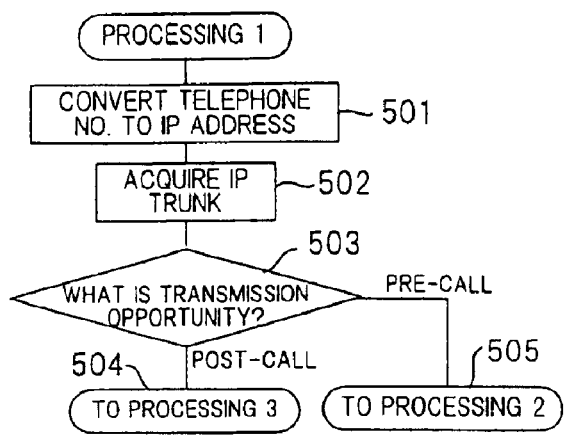
FIGS. 8A to 8J are flowcharts of a variety of processing.
Figure 8B:
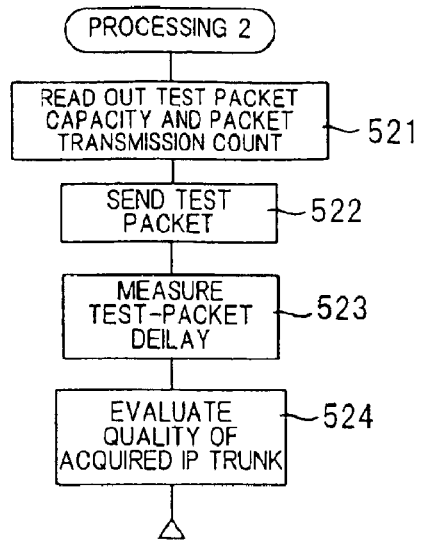

If an outgoing call is made from telephone 10 (see FIG. 2) to telephone 60 at state 0 in FIG. 7, the central controller 22 executes processing 1 in FIG. 8A. Specifically, on the basis of the telephone number of telephone 60, the central controller 22 acquires from the server 70 the IP address of the IP packetizing unit 54 of the other exchange (step 501), then acquires the IP trunk 28b (step 502), reads the transmission opportunity data from the system data of FIG. 3 and evaluates the transmission opportunity (step 503). There are two types of transmission opportunities, namely the post-call voice-quality measurement mode and the pre-call voice-quality measurement mode.

(1) The post-call voice-quality measurement mode is a mode for selecting a network based upon voice-quality data relating to the preceding call, measuring the voice-quality data (packet loss rate) in the course of the current call and saving this data after the current call in order to select a network for the next call. It should be noted that the post-call voice-quality measurement mode can be implemented in the following manner as well: selecting the network based upon the preceding voice-quality data, measuring delay time by sending and receiving test and ACK packets after the current call and saving the delay time in order to make the selection of a network.

(2) The pre-call voice-quality measurement mode is a mode for measuring the current voice quality by sending and receiving test and ACK packets before a call and then selecting a network based upon the measured voice quality.

Figure 8C:
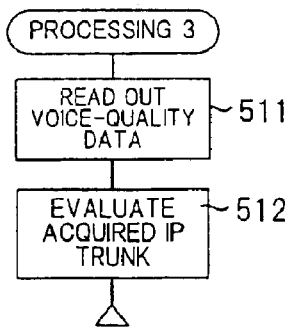
Figure 8D:
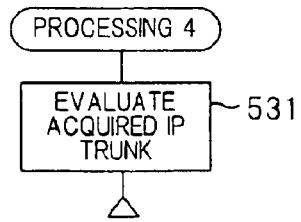

If the central controller 22 determines that the transmission opportunity is indicative of the post-call voice-quality measurement mode (1) at the measurement performed at step S503, the central controller 22 executes processing 3 illustrated in FIG. 8(C) (step 504). If the transmission opportunity is indicative of the pre-call voice-quality measurement mode (2), then the central controller 22 executes processing 2 illustrated in FIG. 8(B) (step 505).

(b) Processing 3

The central controller 22 reads the preceding voice-quality data 304 (see FIG. 3), which conforms to the present day of the week/present time period of the acquired IP trunk 28b, out of the memory 23 (step 511). Next, on the basis of the preceding voice-quality data (packet loss rate or delay time) read out, the central controller 22 evaluates the voice quality of the route through the IP network (step 512). In case of delay time, the evaluation of voice quality involves rendering a "good" decision if the delay time is less than a set value (e.g., 200 ms) and a "poor" decision if the delay time is equal to or greater than the set value. The result of this evaluation is written to the call data 302.

(c) Processing 2

The central controller 22 reads packet capacity 303b and packet count 303c out of the main memory 23 with regard to a test packet used in order to measure voice quality (step 521). Next, the central controller inputs the read test-packet data to the IP packetizing unit 24 and instructs the latter to send a test packet. In response, the IP packetizing unit 24 sends a test packet using TCP (IETF RFC: 793) (step 522). Upon receiving an ACK packet following transmission of the test packet, the IP packetizing unit 24 so notifies the central controller 22 and the latter measures time from transmission of the test packet to receipt of the ACK packet (step 523). Measurement of this elapsed time is performed by starting up a timer immediately after transmission of the test packet and stopping the timer when the ACK packet is received in response to the test packet. If the timer times out after issuance of the test packet, then the time from issuance of the test packet to receipt of the ACK packet is adopted as time-out time. This operation is repeated a number of times equivalent to the number of transmissions, the average value of measured time is obtained and, in a manner similar to that of processing 3 above, the quality is judged to be "good" if the time is less than 200 ms and "poor" if the time is equal to or greater than 200 ms (step 524). The result of this decision is written to the call data 302.

(d) Processing 4

Figure 8E:
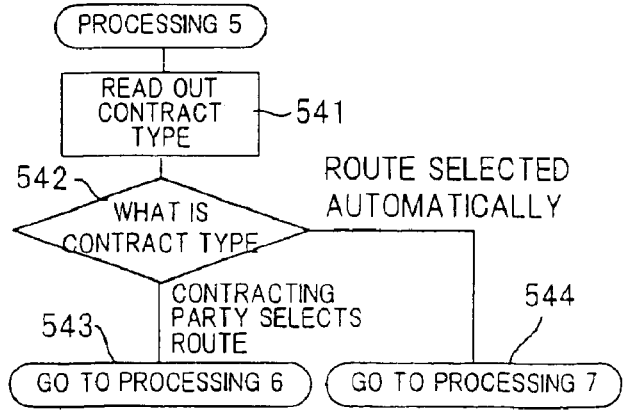

If the decision on voice quality written to the call data 302 through processing 2 or 3 is "good", the central controller 22 selects a route-through the IP network and calls the terminating telephone 60 (state 3) by a call set-up procedure. If the terminating telephone 60 responds by an off-hook indication, the telephones 10 and 60 are placed in a state of communication (state 4) via the IP network. If the "poor" decision is rendered, the processing of FIG. 8E is executed. The foregoing is step 531 in FIG. 8D.

(e) Processing 5

If the voice quality is no good, the central controller 22 reads out the contract type 301 contained in the subscriber data SBDT associated with the originating telephone 10 (step 541) and discriminates the contract type read out (step 542). There are two types of contracts, namely (A) a caller route selection contract and (B) an automatic route selection contract.

(1) The caller route selection contract is such that if the voice quality is "poor", this is reported to the caller by the announcement unit 25 (FIG. 2) so that the caller can select the route by entering a predetermined number by operating keys on the telephone 10.

(2) The automatic route selection contract is such that if the voice quality is "poor", the system selects the route automatically. With automatic route selection, the caller him/herself need not select the route by operating keys.

Figure 8F:
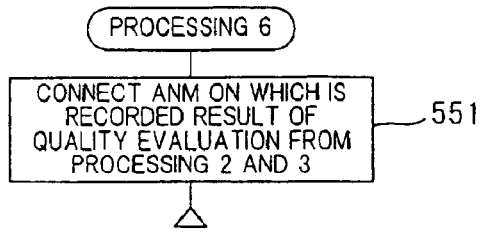
Figure 8G:
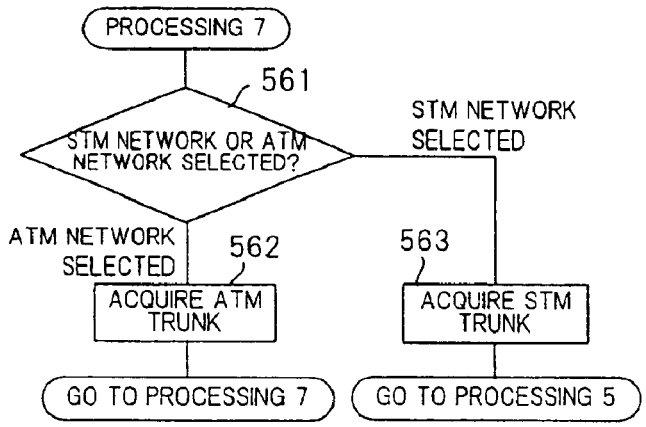

Processing 6 in FIG. 8F is executed (step 543) in case of the contract type described in (1) above, and processing 7 in FIG. 8G is executed (step 544) in case of the contract type described in (2) above.

(f) Processing 6

In case of the contract type described in (1) above, the central controller 22 connects the announcement unit 25 (ANM connection) to the originating telephone 10 via the STM switch network 21 to report by voice the fact that voice quality of the route through the IP network is poor (step 551). For example, the fact that voice quality is poor is reported by the following verbal message: "Poor line conditions in the present connection utilizing the IP network may cause interrupted voice". In response, a transition is made to state 1 in which the caller listens to the announcement.

(g) Processing 7

In case of the contract type described in (2) above, the central controller 22 determines whether to connect the originating telephone 10 and terminating telephone 60 via a route through the STM network or ATM network (step 561). If the connection is to be made via a route through the ATM network, the central controller 22 acquires the ATM trunk 28c (step 562). As a result, state 7 is attained and the terminating telephone 60 is called. If the terminating telephone 60 responds by an off-hook indication, the telephones 10 and 60 are placed in a state of communication (state 8) via the ATM network. In case of the connection via a route through the STM network, on the other hand, the central controller 22 acquires the ATM trunk 28a (step 563). As a result, state 5 is attained and the terminating telephone 60 is called. If the terminating telephone 60 responds by an off-hook indication, the telephones 10 and 60 are placed in a state of communication (state 6) via the STM network.

The selection of a network at step 561 is made upon taking into consideration (1) a method for selecting the ATM network if the STM network is congested, (2) a method of selecting a network for which the telephone charges are low, and (3) a method of selecting a network having excellent line quality. It should be noted that a route can also be selected automatically, the route being not only one through the STP or ATM network but also an alternative route through the IP network. In such case, taking into consideration (1)~(3) above, it would be decided to select a trunk in the following order, by way of example: STM-TG (STM trunk group)‡ ATM-TG‡IP-TG. If the target trunk group is congested, a trunk would be selected from the trunk group of the next rank to thereby decide the network.

(h) Processing 8–10

If notification is given to the effect that voice quality is poor in state 1, the caller selects (1) continue using IP network, (2) STM network, (3) ATM -network, (4) IP network or (5) disconnect. The central controller 22 controls the telephone connection as follows in accordance with the selection made by the caller:

(1) If a fixed period of time passes without entry of a specific number, or if the specific number is entered and its content indicates "selection to continue using IP network", the central controller 22 connects the originating telephone 10 and terminating telephone 60 via the route through the IP network judged to be poor in voice quality. As a result, the terminating telephone 60 is called (state 3) and, if the terminating telephone 60 responds with an off-hook indication, the telephones 10 and 60 are placed in a state of communication (state 4) via the IP network. When the call is implemented through the IP network, the central controller 22 monitors the delay time and lost packet count of packets sent and received during the call and accumulates the monitored data in the call data 302 (see FIG. 3).

Figure 8H:
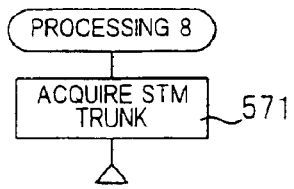

(2) If the content of the specific number indicates "selection of STM network", the central controller 22 acquires the ATM trunk 28a (step 571) in processing 8 shown in FIG. 8H. As a result, the terminating telephone 60 is called (state 5) and, if the terminating telephone 60 responds with an off-hook indication, the telephones 10 and 60 are placed in a state of communication (state 6) via the STM network.

Figure 8I:
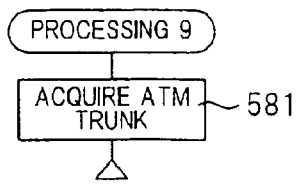

(3) If the content of the specific number indicates "selection of ATM network", the central controller 22 acquires the ATM trunk 28c (step 581) in processing 9 shown in FIG. 8I. As a result, the terminating telephone 60 is called (state 7) and, if the terminating telephone 60 responds with an off-hook indication, the telephones 10 and 60 are placed in a state of communication (state 8) via the ATM network.

(4) If the content of the specific number indicates "selection of IP network again", the central controller 22 executes processing 1, acquires an alternative IP trunk and makes the connection again.

(5) If the content of the specific number indicates "selection of disconnection", the central controller 22 disconnects the telephone.

Figure 8J:
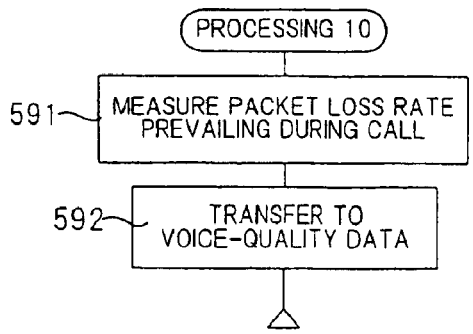

When a call using a route through the IP network is completed, the central controller 22 executes processing 10 shown in FIG. 8J. Specifically, the central controller 22 calculates the packet loss rate or measures the time delay during the call and writes the same to the call data 302 (step 591). The central controller 22 then preserves the data, which has accumulated in the call data, as the voice-quality data 304 in the system data SYDT and subsequently utilizes the data to evaluate voice quality (step 592). In this case an arrangement can be adopted in which only one loss rate or delay time is accumulated per route/time period or a plurality are accumulated and voice quality is evaluated by referring to a value obtained by statistically processing the accumulated loss rates. Examples of statistical processing averaging processing and weighted averaging processing in which older data is given less weight.

(D) Modifications

The foregoing embodiment relates to a case where evaluation of voice quality is performed on a per-call basis. However, an arrangement can be adopted in which whether the evaluation is performed every call or every several calls is set in the main memory 23 beforehand and, if the evaluation is performed every several calls, the result of evaluating voice quality is stored every several calls and evaluation regarding a new call is carried out by referring to the stored results of evaluation.

The foregoing embodiment relates to a case where, if voice quality is poor, the agreement with the subscriber determines that (1) control of the telephone connection is performed in accordance with a command from the user or that (2) control of the telephone connection is performed upon selecting a route automatically in accordance with the determination made by the system. However, in a case where connection of the telephone is possible only through one of these methods, then the telephone is connected by that method.

Further, the foregoing embodiment relates to a case where voice quality can be evaluated in either of two modes, namely the post-call voice-quality measurement mode or the pre-call voice-quality measurement mode, and the mode in which voice quality is to be evaluated is set in advance However, an arrangement can be adopted in which evaluation is possible in one mode and the evaluation is carried out in this mode.

Thus, in accordance with the present invention as described above, in a VoIP telephone connection service in which a telephone is connected via an IP network, voice quality along a route through the IP network is evaluated before a call is made. If the voice quality is good, the originating and terminating terminals are connected via this route. If the voice quality is poor, then, in accordance with a command from the caller or automatically in accordance with a determination made by the system, a route other than the above-mentioned route [e.g., an alternative route through the IP network or another route via a network (STM or ATM network) other than the IP network] is selected to control the connection of the telephone. As a result, a telephone call can be implemented with an excellent voice quality.

Further, in accordance with the present invention, a test packet and an ACK packet are sent and received between an exchange on the originating side and an exchange on the terminating side via a route through the IP network before a channel is established, and the voice quality of the route through the IP network is evaluated based upon the length of delay time from issuance of the test packet to receipt of the ACK packet. As a result, control of a telephone connection can be performed upon measuring voice quality in real time and excellent call quality can be achieved in reliable fashion.

Further, in accordance with the present invention, voice-quality data such as packet loss rate during a call is saved on a per-route basis after the call ends and the voice quality of a current call via a route through an IP network is evaluated by referring to the saved loss rate. As a result, it is unnecessary to measure voice quality before the channel is established and it is therefore possible to shorten time required for a call to start.

Further, in accordance with the present invention, if voice quality of a route through the IP network is not good, the exchange reports this to the caller by voice and the caller, by operating keys on a terminal, instructs the exchange to perform one of the following control operations: (1) to continue connection control via the route for which the voice quality has been determined to be poor; (2) to perform connection control via an alternative route through the IP network; (3) to perform connection control through another route via a network other than the IP network; and (4) to perform disconnect control. If this arrangement is adopted, the caller can specify control for the next telephone connection through a simple operation without being required to redial.

Further, in accordance with the present invention, if voice quality of a route through the IP network is poor, an alternative route through the IP network or another route within a network (e.g., STM or ATM network) other than the IP network is selected automatically and the originating and terminating terminals are connected via the selected route. As a result, greater convenience can be provided because an excellent route can be selected without requiring that the caller perform any operation.

As many apparently widely different embodiments of the present invention can be made without departing from the spirit and scope thereof, it is to be understood that the invention is not limited to the specific embodiments thereof except as defined in the appended claims.

What is claimed is:

1. A communication device connection method for connecting a call originating terminal to a call terminating terminal via an IP network, comprising:
a first step of setting how to evaluate communication quality;
a second step of evaluating communication quality along a route through the IP network from a switching system on an originating side to a switching system on a terminating side when a call originate request has been issued to connect the originating terminal to the terminating terminal via the IP network;
a third step of connecting the originating terminal and the terminating terminal if the communication quality is good; and
if the communication quality is bad, a fourth step of controlling connection of the communication device in accordance with a command from the caller or controlling connection of the communication device by selecting a route other than the first-mentioned route automatically in accordance with a determination made by a switching system, wherein in a case where said communication quality is evaluated by a pre-call voice-quality measurement mode said second step includes the steps of:
sending a test packet from the switching system on the originating side to the switching system on the terminating side via the route through the IP network before a channel is established;
sending an ACK packet from the switching system on the terminating side to the switching system on the originating side in response to receipt of the test packet;
measuring, at the switching system on the originating side, delay time from sending of the test packet to receipt of the ACK packet; and
determining whether communication quality is good or bad based upon a comparison of length of the delay time and length of a set time; and
wherein in a case where said communication quality is evaluated by a past-call voice-quality measurement mode, said second step further includes the steps of:
storing communication-quality data including packet loss rate that prevailed during a previous call after the previous call ends; and
determining whether communication quality is good or bad by referring to the communication-quality data that has been preserved.

2. The method according to claim 1, wherein said first step further includes the steps of:
setting beforehand, in conformity with the system, whether the determination as to whether communication quality is good or bad is to be performed every call or every several calls,
if the determination is to be performed every several calls, storing results of evaluation of communication quality every several calls; and
performing the determination as to whether communication quality is good or bad with regard to a new call by referring to the results of evaluation of communication quality that have been stored.

3. The method according to claim 1, wherein said first step further includes' the steps of:
setting beforehand, in conformity with the system, capacity of a single test packet and test-packet transmission count;
accumulating delay time with regard to each test packet; and
determining whether communication quality is good or bad based upon a comparison of an average value of accumulated delay time and length of a set time.

4. The method according to claim 1, wherein in a case where connection of the communication device is controlled in accordance with a command from the caller, the fact that communication quality is bad is output by voice from the originating terminal to so notify the caller.

5. The method according to claim 1, wherein in a case where connection of the communication device is controlled in accordance with a command from the caller, one of the following control operations is instructed by a command from the user: (1) connection control via the above-mentioned route; (2) connection control via an alternative route through the IP network; (3) connection control through another route via a network other than the IP network; and (4) transmission disconnect control.

6. The method according to claim 1, wherein in a case where connection of the communication device is controlled in accordance with a determination made by the switching system, the system selects an alternative route through the IP network or another route within a network other than the IP network and connects the originating terminal and the terminating terminal via the route selected.

7. The method according to claim 1, wherein said third step further includes the steps of:

establishing beforehand by agreement with a subscriber, if communication quality is bad, whether (1) connection of the communication device is to be controlled in accordance with a command from the caller or (2) connection of the communication device is to be controlled by selecting a route automatically in accordance with a determination made by the system; and controlling connection of the communication device based upon the agreement with the subscriber if the communication quality is bad.

8. A communication device connection method for connecting a call originating terminal to a call terminating terminal via an IP network, comprising:

a first step of evaluating communication quality along a route through the IP network from a switching system on an originating side to a switching system on a terminating side when a call originate request has been issued to connect the originating terminal to the terminating terminal via the IP network;

second step of connecting the originating terminal and the terminating terminal if the communication quality is good; and if the communication quality is bad, a third step of controlling connection of the communication device in accordance with a command from the caller or controlling connection of the communication device by selecting a route other than the first-mentioned route automatically in accordance with a determination made by a switching system;

wherein said first step further includes the steps of:

storing communication-quality data including packet loss rate that prevailed during a previous call after the previous call ends; and determining whether communication quality is good or bad by referring to the communication-quality data that has been stored.

9. The method according to claim 8, wherein the communication-quality data is stored for every route and for every day of the week and time period.

10. The method according to claim 8, wherein the communication-quality data is accumulated for every route and whether communication quality is good or bad is determined by referring to a value obtained by statistically processing the communication-quality data that has been accumulated.

11. A communication device connection apparatus for connecting a call originating terminal to a call terminating terminal via an IP network, comprising:

means for setting how to evaluate communication quality;

quality evaluation means for evaluating communication quality along a route through the IP network from a switching system on an originating side to a switching system on a terminating side when a call originate request has been issued to connect the originating terminal to the terminating terminal via the IP network;

means for connecting the originating terminal and the terminating terminal if the communication quality is good;

means for controlling connection of the communication device in accordance with a command from the caller, and/or means for controlling connection of the communication device by selecting a route other than the first-mentioned route automatically without relying upon a command from the caller, if the communication quality is bad, wherein in a case where said communication quality is evaluated by a pre-call voice-quality measurement mode, said quality evaluation means includes:

means for sending a test packet from The switching system on the originating side to the switching system on the terminating side via the route through the IP network before a channel is established;

means for receiving an ACK packet sent from the switching system on the terminating side in response to receipt of the test packet and measuring delay time from sending of the test packet to receipt of the ACK packet; and means for whether communication quality is good or bad based upon a comparison of length of the delay time and length of a set time, and wherein in a case where said communication quality is evaluated by a post-call voice-quality measurement mode, said quality evaluation means further includes:

preservation means for preserving communication-quality data such as packet loss rate that prevailed during a call after the call ends; and means for determining whether communication quality is good or bad by referring to the communication-quality data that has been preserved.

12. The apparatus according to claim 11, wherein said quality evaluation means includes:

means for setting beforehand whether the determination as to whether communication quality is good or bad is to be performed every call or every several calls; and means for storing results of evaluation of communication quality every several calls if the determination is to be performed every several calls;

said quality evaluation means performimg the determination as to whether communication quality is good or bad with regard to a new call by referring to the results of evaluation of communication quality that have been stored.

13. The apparatus according to claim 11, wherein said quality evaluation means further includes;

means for setting beforehand capacity of a single test packet and test-packet transmission count; and means for accumulating delay time with regard to each test packet;

said quality evaluation means determining whether communication quality is good or bad based upon a comparison of a value obtained by statistically processing delay time that has been accumulated and a set time.

14. The apparatus according to claim 11, wherein said means for controlling connection of the communication device in accordance with a command from the caller includes notification means for outputting, by voice, the fact that communication quality is bad to so notify the caller.

15. The apparatus according to claim 11, wherein said means for controlling connection of the communication device in accordance with a command from the caller performs one of the following control operations in response to a command from the caller: (1) connection control via the above-mentioned route; (2) connection control via an alternative route through the IP network; (3) connection control through another route via a network other than the IP network; and (4) transmission disconnect control.

16. The apparatus according to claim 11, further comprising means for establishing beforehand by agreement with a subscriber, if communication quality is bad, whether (1) connection of the telephone is to be controlled in accordance with a command from the caller or (2) connection of the communication device is to be controlled by selecting a route automatically in accordance with a determination made by the system.

17. A communication device connection apparatus for connecting a call originating terminal to a call terminating terminal via an IP network, comprising:

quality evaluation means for evaluating communication quality along a route through the IP network from a switching system on an originating side to a switching system on a terminating side when a call originate request has been issued to connect the originating terminal to the terminating terminal via the IP network;

means for connecting the originating terminal and the terminating terminal if the communication quality is good;

means for controlling connection of the communication device in accordance with a command from the caller, and/or means for controlling connection of the communication device by selecting a route other than the first-mentioned route automatically without relying upon a command from the caller, if the communication quality is bad;

wherein said quality evaluation means further includes:

means for storing communication-quality data including packet loss rate that prevailed during a previous call after the previous call ends; and means for determining whether communication quality is good or bad by referring to the communication-quality data that has been stored.

18. The apparatus according to claim 17, wherein the communication-quality data is stored for every route and for every day of the week and time period.

19. The apparatus according to claim 17, wherein the communication-quality data is accumulated in said preservation means for every route, and said quality evaluation means determines whether communication quality is good or bad by referring to a value obtained by statistically processing the communication-quality data that has been accumulated.

* * * * *